Feb. 19, 1957 W. R. ISOM 2,781,982

REELING SYSTEM

Filed June 2, 1952 2 Sheets-Sheet 1

INVENTOR
WARREN R. ISOM
BY Morris A. Rabkin
ATTORNEY

Feb. 19, 1957 | W. R. ISOM | 2,781,982

REELING SYSTEM

Filed June 2, 1952 | 2 Sheets-Sheet 2

INVENTOR
WARREN R. ISOM
BY Morris L. Lakin
ATTORNEY

United States Patent Office 2,781,982
Patented Feb. 19, 1957

2,781,982

REELING SYSTEM

Warren Rex Isom, West Collingswood, N. J., assignor to Radio Corporation of America, a corporation of Delaware Application June 2, 1952, Serial No. 291,172

The terminal fifteen years of the term of the patent to be granted has been disclaimed 9 Claims. (Cl. 242—55)

This invention relates to reeling systems, and more particularly, to a reeling system wherein a perforated web such, for example, as a tape, film or the like bearing a sound track may be fed through a motion picture machine synchronously with a separate picture bearing film.

Heretofore there have been proposed several arrangements for obtaining synchronism between a sound record tape or film and a motion picture film. However, these devices include the use of separate machines for the tape and film. Some means must be provided for obtaining a synchronizing signal from one of the machines or one of the films which is employed to control the speed of the other. Such arrangements entail the use of electronic circuitry to accomplish synchronization.

It is, accordingly, an object of this invention to provide an improved reeling system for separate picture film and sound record bearing tape, film or the like wherein both the picture film and the sound tape or film are fed over separate paths in a single machine.

It is another object of this invention to provide a reeling system as set forth wherein synchronism between the two films is obtained mechanically.

It is a further object of this invention to provide means for reeling a separate sound record bearing tape or film in synchronism with a picture bearing film wherein the means comprises an attachment to a conventional motion picture machine.

In accomplishing these and other objects, there has been provided, in accordance with the present invention, a mounting bracket which may be secured to a motion picture machine in place of a supply reel arm or the like. The bracket carries a picture film supply reel, also a supply reel and a take-up reel for a separate sound tape or film. For the sake of convenience of description, the term "film" or "sound film" will be used in connection with the web such as the tape, film, or the like bearing the sound track. Intermediate the sound film supply and take-up reels there is positioned a plurality of guide means defining a path for the sound film which runs adjacent to a sound record translating head. There is also provided, on the bracket, a sprocket which is engaged by both the picture film and the sound film. Since the two films are positively engaged by the same sprocket, synchronism of their advancement is assured.

A better understanding of the invention may be had from the following detailed description when read in connection with the accompanying drawings in which.

Figure 1:
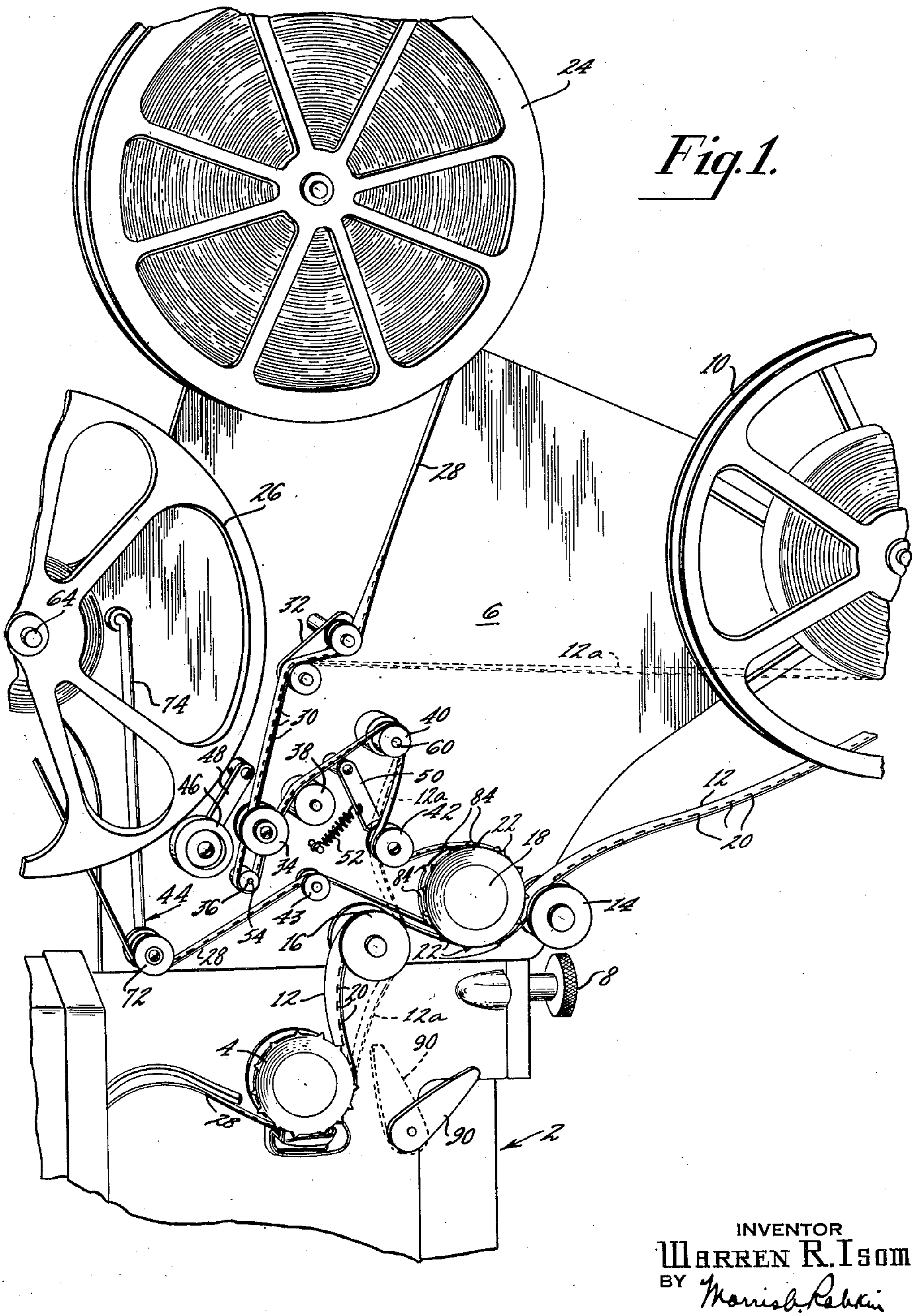
Fig. 1 is a fragmentary perspective front view of the apparatus embodying the invention.

Referring to the drawings in detail, there is shown a portion of a conventional motion picture projector 2 having an upper film driven sprocket 4 (Fig. 1). In place of a conventional supply reel arm, a mounting bracket 6 is secured to the projector 2 by a thumb screw 8. This mounting bracket 6 carries a supply reel 10 for a picture bearing film 12. Two guide rollers 14 and 16, both of which appear in Fig. 1, are positioned on opposite sides of a control sprocket 18 to define a path of movement for the picture film 12 into engagement with the sprocket 18. The film 12 has sprocket holes 20 therein which positively engage the teeth 22 of the sprocket 18.

The bracket 6 also carries a supply reel 24 and a take-up reel 26 for a separate sound record film 28. While the sound record on the film 28 may be of any suitable type, in a preferred embodiment of the invention the sound record is in the form of a magnetic record impressed upon a magnetizable record tape. In the latter case, the tape may be a commercially available quarter-inch tape which is modified by having sprocket holes 30 perforated along one edge thereof. The path of the tape 28 between its supply reel 24 and its take-up reel 26 lies in substantially the same general vertical plane as the path of the film 12 and is defined by a tension-couple guide member 32 which is biased by a spring (not shown), a second guide member 34, a first stabilizer 36, a signal transducer 38, a second stabilizer 40, a tension roller 42, the sprocket 18, a third guide member 43, and a take-up tension control member 44.

The tape 28 is held in intimate contact with the first stabilizer 36 by a resilient pinch roller 46 mounted on a pivot arm 48. The arm 48 and the roller 46 are biased toward the stabilizer 36 by a suitable spring (not shown). The tension roller 42 is mounted on a pivoted arm 50 and is biased by a spring 52. This tension roller 42 maintains the tape 28 in intimate contact with the second stabilizer 40 by tensioning the tape 28 between that stabilizer and the sprocket 18. A suitable drag such as friction means (not shown) is applied to the pinch roller 46 in order to assure that the tape 28 will be under tension as it passes the transducer 38.

Figure 2:
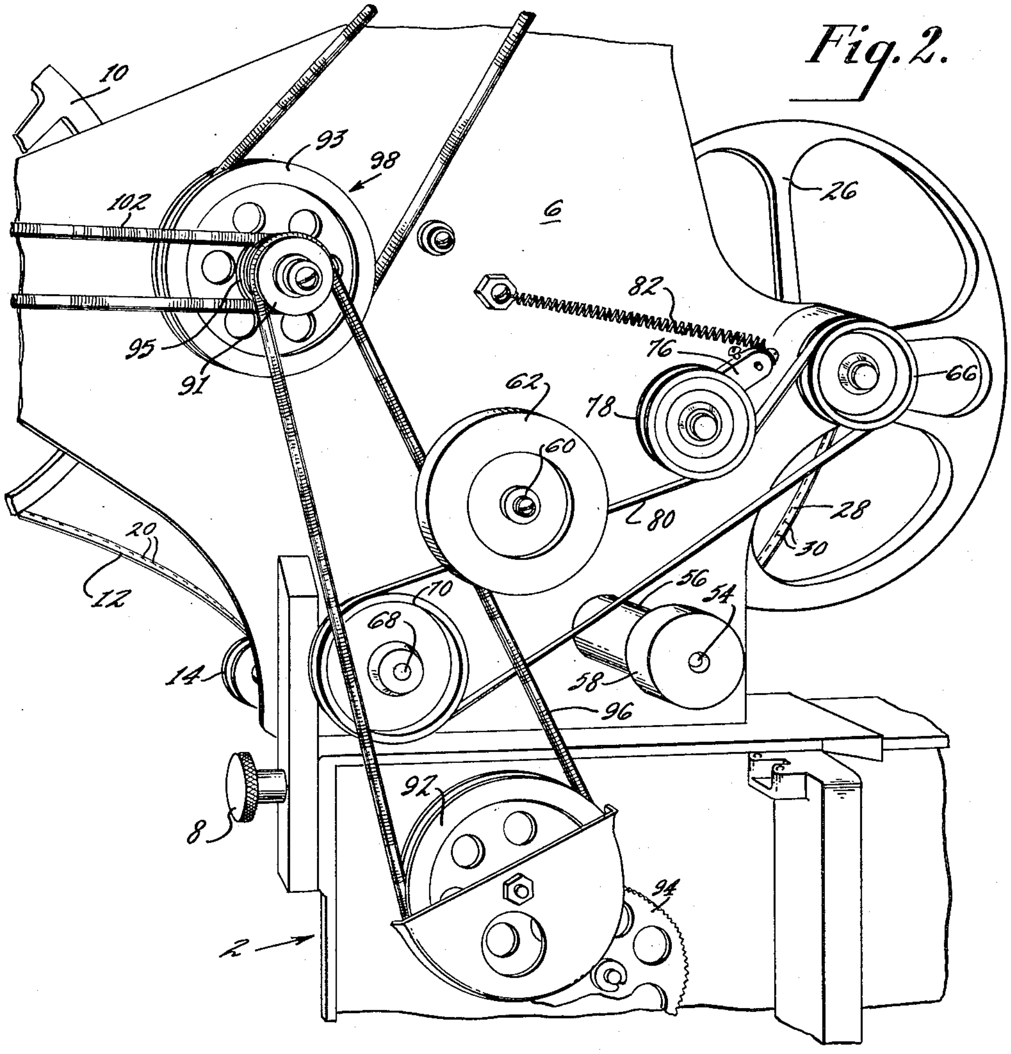
Fig. 2 is a view similar to Fig. 1, but showing the reverse side of the apparatus shown in Fig. 1.

The first stabilizer 36 is mounted on a shaft 54 which is journaled in a suitable bearing 56 (Fig. 2) and protrudes through the bracket 6. The end of the shaft 54 which protrudes through the bracket 6 carries a flywheel 58 as shown in Fig. 2. The rotational inertia of the flywheel 58 stabilizes the rotary motion of the stabilizer 36, and hence, the linear motion of the film 28 in contact therewith.

The second stabilizer 40 is mounted on a shaft 60 which is similarly journaled and also extends through the bracket 6. That portion of the shaft 60 which extends through the bracket 6 carries a flywheel 62 (Fig. 2). Both of the stabilizers are driven by the movement of the tape 28.

The sound film take-up reel 26 is removably mounted on a spindle or shaft 64 which is suitably journaled and passes through the bracket 6. A pulley 66 (Fig. 2) is secured to that portion of the shaft 64 which extends from the rear side of the bracket 6. The sprocket 18 is mounted on a shaft 68 which extends through the bracket and to the opposite end of which there is secured a pulley 70 (Fig. 2). The take-up tension control member 44 comprises a jockey roller 72 which rides in a loop in the sound film 28 and is mounted on a first bar 74 of a crank which protrudes through the bracket 6. On the opposite side of the bracket 6 a second bar 76 of the crank is secured to the protruding portion of the first bar 74 and carries a second jockey roller 78 on its free end. A belt 80 connects the sprocket pulley 70 and the tape take-up pulley 66. The jockey roller 78 is biased into contact with the span of the belt 80 by a spring 82. By controlling the force applied to the belt 80 by the jockey roller 78, the tension in the belt 80 may be controlled. The tension in the belt 80 determines the driving force transmitted to the take-up pulley 66 from the sprocket pulley 70 by the belt 80, the sprocket 18, and hence its pulley, being driven by the picture film 12. Thus, if the tension in the sound film 28 between the take-up reel 26 and the sprocket 18 increases, the loop in the tape shortens moving the jockey roller 72 against the force of the spring 82 decreasing the tension in the belt 80 and accordingly, reducing the torque transmitted to the take-up reel 26. This arrangement constitutes an automatically adjusted friction clutch.

Figure 3:
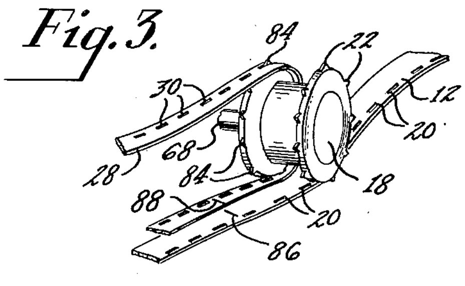
Fig. 3 is a fragmentary view in perspective showing the relationship of the two films to their common sprocket.
Figure 4:
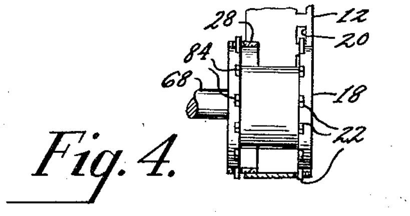
Fig. 4 is a view in side elevation of the apparatus parts shown in Fig. 3.

To operate the apparatus, the sound film 28 is first fed through its path, including being placed around the sprocket 18. The sprocket 18 has a second set of teeth 84 on the edge opposite from the teeth 22. The sprocket holes 30 in the sound film are engaged by the teeth 84. Then the picture film 12 is fed through its path occupying a position on the sprocket 18 overlapping the sound film 28 as shown in Figs. 3 and 4. When the machine is turned on, the picture film 12 will be pulled from the supply reel 10 by the film driving sprocket 4. Since the teeth 22 of the sprocket 18 engage the holes 20 in the film 12, movement of the film 12 causes the sprocket 18 to turn. Since the teeth 84 of the sprocket 18 engage the holes 30 in the sound film 28, the turning of the sprocket 18 pulls the sound film 28 from its supply reel 24, and along the path including the transducer 38. As the sprocket 18 turns, pulling the film 28 from its supply reel 24, the tape take-up reel 26 is also driven to wind up the tape 28 after it has left the sprocket 18. Inasmuch as both films are in positive engagement with the same sprocket 18, they must travel at the same linear speed. Therefore, with the apparatus herein described, a picture film and a separate sound film may be driven in synchronism with each other without the use of auxiliary synchronizing electronic circuits.

In order that the sound film 28 will be in register with the picture film 12, suitable index marks such as ink lines 86 and 88 (Fig. 3) may be placed on the film 28 and the film 12, respectively. When these two marks are placed together while the film and the tape are being initially threaded into the apparatus, the film and the tape run in register and synchronously.

After the film 12 and the film 28 have been run and they are all on their respective take-up reels, provision is made for rewinding them, simultaneously, back onto their supply reels. On the main body of the projector 2 as viewed in Fig. 1, there is a control lever 90. This controls the direction in which the picture film 20 will be run. When the lever 90 is in the position shown in solid lines the film 12 will be driven in the forward direction. However, when the lever 90 is in the position shown by dotted lines, the film 12 will be driven in the reverse direction, that is, from the take-up reel to the supply reel. Movement of the control lever 90 to the dotted line rewind position causes engagement of a gear (not shown), operatively connected to a pulley 92 (Fig. 2), with a gear 94 powered in any suitable and known manner. The pulley 92 is connected by a spring belt 96 to the pulley 91 of a pulley cluster 98. To each of the film supply reel 10 and the sound film supply reel 24 there is operatively connected a pulley (not shown). The pulley associated with the reel 24 is connected to a pulley 93 of the pulley cluster 98 by a spring belt 100. The pulley associated with the reel 10 is connected by a belt 102 to the pulley 95. Thus, when the control lever 90 is thrown to its rewind position, the pulley 92 is driven by the gear 94, and in turn drives the two supply reels 10 and 24 in a direction to rewind the two films 12 and 28.

There has recently been proposed a picture film which carries a magnetic sound track instead of the heretofore usual optical sound track. The arrangement of elements on the mounting bracket 6 is such that a film of this type may be accommodated. The film 12 is threaded along an alternate path indicated by the dotted lines 12*a* as shown in Fig. 1. From the supply reel 10, the film is threaded around the tension guide member 32, past the guide member 34, around the first stabilizer 36, over the transducer 38, around the second stabilizer 40, between the tension roller 42 and the guide roller 16 and thence, to the film drive sprocket 5.

It may now be seen that there has been provided, in accordance with the present invention, means comprising an attachment to a conventional motion picture apparatus whereby a picture film and a separate sound film may be operated in synchronism with each other, on the same machine, and without the necessity of interconnecting electrical synchronizing circuits. The same attachment is adapted to allow a conventional motion picture machine to accommodate and reproduce sound from a picture film bearing a magnetic sound track.

What is claimed is:

1. In a motion picture apparatus, means for feeding a separate sound record film synchronously with a picture film, said feeding means comprising means defining a path of advancement for said sound record film and means defining a path of advancement for said picture film, both of said paths being in substantially the same general plane, both of said path defining means including a sprocket common to both of said films, said sprocket being driven by said picture film and driving said sound record film.

2. In a motion picture apparatus, means for feeding a separate sound record film synchronously with a picture film, said feeding means comprising means defining a path of advancement for said sound record film along a portion of which the sound recorded on said film is adapted to be picked up for reproduction into audible signals, said path defining means including a first film motion stabilizing device and a second film motion stabilizing device, said portion of said path being disposed between said stabilizing devices, and means defining a path of advancement for said picture film, both of said paths being in substantially the same general plane, both of said paths defining means including a sprocket common to both of said films, said sprocket being driven by picture film and driving said sound record film.

3. Apparatus for reeling two perforated films in synchronism with each other and in substantially the same general plane, said apparatus comprising, in combination, a first reeling system for one of said films, a second reeling system for the other of said films, and a sprocket common to both of said reeling systems, said sprocket having a first set of teeth for engaging the perforations in one of said films and a second set of teeth for engaging the perforations in the other of said films, said sprocket being driven by one of said films and driving the other of said films.

4. The invention as set forth in claim 3 wherein one of said films is sound record bearing film and the other of said films is a motion picture film.

5. The invention as set forth in claim 4 wherein said sound bearing record bearing film comprises a magnetic record tape.

6. Apparatus for reeling two perforated films in synchronism with each other wherein one of said films comprises a magnetic sound record and the other of said films comprises a motion picture film, said apparatus comprising, in combination, a first reeling system for said sound film, a second reeling system for said picture film, the film paths defined by both of said reeling systems lying in substantially the same plane, and a sprocket common to both of said reeling systems, said sprocket being driven by said picture film and driving said sound film.

7. The invention as set forth in claim 6 wherein said first reeling system includes a first film motion stabilizing means, and a second film motion stabilizing means whereby the sound magnetically recorded on said sound record is adapted to be picked up therefrom for reproduction into audible signals while said sound record is being reeled from said first to said second stabilizing means.

8. The invention as set forth in claim 7 wherein all of said first reeling systems and at least a part of said second reeling system and including said common sprocket are mounted on a mounting bracket, said bracket constituting an attachment for a motion picture machine.

9. As an attachment for a motion picture projector, a bracket, first and second supply reel means mounted on said bracket, said first supply reel means being provided to accommodate a picture bearing film, said second supply reel means being provided to accommodate a sound record bearing film, take-up reel means mounted on said bracket for said sound record bearing film, means carried by said bracket for defining a path of advancement of said sound record bearing film between said second supply reel means and said take-up reel means, said path defining means including a first film motion stabilizing means, a second film motion stabilizing means, and a film driving sprocket, and means carried by said bracket for defining a portion of a path of advancement of said picture bearing film, said picture film path lying in substantially the same general plane as said sound record film path, said picture film path defining means including said sprocket, said sprocket being driven by said picture bearing film.

References Cited in the file of this patent

UNITED STATES PATENTS

| | | |
|---|---|---|
| 1,480,992 | Chipman | Jan. 15, 1924 |
| 1,843,972 | De Forest | Feb. 9, 1932 |
| 1,891,738 | Thomas | Dec. 20, 1932 |
| 1,936,043 | Thomas | Nov. 21, 1933 |
| 1,957,525 | Brown et al. | May 8, 1934 |
| 1,986,053 | Friess | Jan. 1, 1935 |
| 1,991,472 | Stern | Feb. 19, 1935 |
| 2,176,828 | Walker | Oct. 17, 1939 |
| 2,284,150 | Kemna | May 26, 1942 |
| 2,576,710 | Andrews | Nov. 27, 1951 |

FOREIGN PATENTS

| | | |
|---|---|---|
| 825,051 | France | Nov. 27, 1937 |
| 861,199 | Germany | Dec. 29, 1952 |
| 1,055,220 | France | Oct. 14, 1953 |